US009393922B2

(12) United States Patent
Larner et al.

(10) Patent No.: US 9,393,922 B2
(45) Date of Patent: Jul. 19, 2016

(54) DEVICES AND METHODS FOR AN ENERGY-ABSORBING END OF A VEHICLE

(71) Applicant: Google Inc., Mountain View, CA (US)

(72) Inventors: Daniel Lynn Larner, San Jose, CA (US); Alex Khaykin, San Francisco, CA (US); Thomas Daniel, San Francisco, CA (US); Felix Jose Alvarez Rivera, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/286,545

(22) Filed: May 23, 2014

(65) Prior Publication Data

US 2015/0336524 A1    Nov. 26, 2015

(51) Int. Cl.
*B60R 19/04* (2006.01)
*B60R 19/03* (2006.01)
*B60R 19/18* (2006.01)
*B60R 21/34* (2011.01)
*B60R 11/04* (2006.01)
*B60R 11/00* (2006.01)

(52) U.S. Cl.
CPC .............. *B60R 19/04* (2013.01); *B60R 11/04* (2013.01); *B60R 19/03* (2013.01); *B60R 19/18* (2013.01); *B60R 21/34* (2013.01); *B60R 2011/004* (2013.01); *B60R 2019/186* (2013.01); *B60R 2021/343* (2013.01)

(58) Field of Classification Search
CPC ........ B60R 21/38; B60R 19/12; B60R 19/16; B60R 19/03; B60R 19/04; B60R 19/44; B60R 21/34; B60R 2021/0004; B62D 63/025; B62D 25/105

USPC ......... 293/4, 102, 120, 126, 144; 296/187.09, 296/193.04, 193.09, 193.11
See application file for complete search history.

(56) References Cited

U.S. PATENT DOCUMENTS

| | | | | |
|---|---|---|---|---|
| 4,148,505 A | * | 4/1979 | Jensen | B62D 21/152 280/784 |
| 4,881,756 A | * | 11/1989 | Kumasaka et al. | 280/785 |
| 5,619,784 A | * | 4/1997 | Nishimoto et al. | 29/430 |

(Continued)

FOREIGN PATENT DOCUMENTS

| | | |
|---|---|---|
| DE | 10302756 B4 * | 2/2012 |
| JP | 2006306363 A | 11/2006 |

(Continued)

OTHER PUBLICATIONS

Pedestrian safety through vehicle design, http://en.wikipedia.org/wiki/Pedestrian safety through vehicle design, visited and printed from internet on May 23, 2014.

(Continued)

*Primary Examiner* — Jason S Morrow
(74) *Attorney, Agent, or Firm* — McDonnell Boehnen Hulbert & Berghoff LLP

(57) ABSTRACT

A vehicle is provided that includes a frame and a mount to couple a first end of an apparatus to the frame. The apparatus comprises a central region that includes a first energy-absorbing material. A first side of the central region is included in the first end of the apparatus coupled to the frame. The apparatus comprises a side region that includes a second energy-absorbing material. The side region is positioned along a second side of the upper region. The side region is configured to be positioned above a wheel of the vehicle.

19 Claims, 6 Drawing Sheets

(56) References Cited

U.S. PATENT DOCUMENTS

| | | | | |
|---|---|---|---|---|
| 5,688,021 | A | * | 11/1997 | Tomforde et al. ........ 296/203.01 |
| 6,276,477 | B1 | * | 8/2001 | Ida ............................... 180/89.1 |
| 6,398,276 | B1 | * | 6/2002 | Smith ........................... 293/142 |
| 6,726,260 | B1 | * | 4/2004 | Wang et al. .................... 293/119 |
| 7,287,797 | B1 | * | 10/2007 | Belloso ........................ 296/35.1 |
| 7,399,028 | B1 | * | 7/2008 | Castillo ............... B62D 29/043 |
| | | | | 296/187.02 |
| 7,581,769 | B2 | | 9/2009 | Wakabayashi et al. |
| 7,896,410 | B2 | | 3/2011 | Morikawa et al. |
| 2004/0007898 | A1 | * | 1/2004 | Pommeret et al. ....... 296/187.01 |
| 2004/0130186 | A1 | * | 7/2004 | Andre et al. ............. 296/193.11 |
| 2005/0001452 | A1 | * | 1/2005 | White et al. ............. 296/193.11 |
| 2006/0049668 | A1 | * | 3/2006 | Eipper et al. ............. 296/193.04 |
| 2007/0257518 | A1 | * | 11/2007 | Matsushima et al. .... 296/193.11 |
| 2009/0195020 | A1 | * | 8/2009 | Wang et al. .............. 296/187.09 |
| 2010/0314907 | A1 | * | 12/2010 | Iwano et al. ............. 296/187.09 |
| 2012/0038188 | A1 | | 2/2012 | Challal et al. |
| 2012/0119543 | A1 | * | 5/2012 | Stedman et al. ......... 296/193.04 |
| 2012/0292931 | A1 | * | 11/2012 | Mizoguchi et al. ........... 293/102 |
| 2013/0026772 | A1 | * | 1/2013 | Huber .......................... 293/102 |
| 2013/0093200 | A1 | | 4/2013 | Tanton |
| 2013/0147216 | A1 | | 6/2013 | Kim |
| 2013/0193698 | A1 | | 8/2013 | Nagwanshi et al. |
| 2014/0062142 | A1 | * | 3/2014 | Ikeda et al. .............. 296/193.11 |
| 2014/0175825 | A1 | * | 6/2014 | Shimanaka ............ B62D 25/16 |
| | | | | 296/39.3 |

FOREIGN PATENT DOCUMENTS

| | | | |
|---|---|---|---|
| JP | 2007-112298 A | * | 5/2007 |
| JP | 2011025890 A | | 2/2011 |
| WO | 2011109718 A2 | | 9/2011 |

OTHER PUBLICATIONS

International Search Report and Written Opinion of corresponding International Application No. PCT/US2015/030048 (mailed Aug. 6, 2015).

* cited by examiner

DEVICES AND METHODS FOR AN ENERGY-ABSORBING END OF A VEHICLE

BACKGROUND

Unless otherwise indicated herein, the materials described in this section are not prior art to the claims in this application and are not admitted to be prior art by inclusion in this section.

Motorized vehicles have been used for over 100 years to transport people and products from one location to another location. Various autonomous systems and protective features have been developed and installed in vehicles as safety features. One example of an autonomous system is an automatic braking system that functions to apply the brakes and slow the vehicle without any driver input when an object near the vehicle is detected. Another example of an autonomous system is an emergency brake assist system that functions to increase braking pressure when an emergency stop is detected.

Vehicle bumpers and airbags are two examples of protective features. Vehicle bumpers may be installed on the front and rear of a vehicle. Such vehicle bumpers are generally designed to absorb energy. Airbags may be designed to deploy when the vehicle detects a contact with an object in order to prevent injury to occupants of a vehicle. Some vehicles include external airbags that are affixed to a vehicle's cowl and configured to cover the surface of a windshield with a compliant material when the vehicle detects a contact with an object. The external airbags may help mitigate an impact of the object with the vehicle's windshield, for example.

SUMMARY

In one example, a vehicle is provided that includes a frame. The vehicle also includes an apparatus coupled to the frame at a first end of the apparatus. The apparatus comprises a central region that includes a first energy-absorbing material. A first side of the central region may be included in the first end of the apparatus coupled to the frame. The apparatus further comprises a side region that includes a second energy-absorbing material. The side region may be positioned along a second side of the central region. The side region may be configured to be positioned above a wheel of the vehicle. The vehicle further comprises a mount to couple the apparatus with the frame.

In another example, an apparatus is provided that comprises a mount to couple a first end of the apparatus with a vehicle. The apparatus comprises a central region that includes a first energy-absorbing material. A first side of the central region may be included in the first end of the apparatus coupled to the mount. The apparatus also comprises a side region that includes a second energy-absorbing material. The side region may be positioned along a second side of the central region. The side region may be configured to be positioned above a wheel of the vehicle.

In yet another example, an apparatus is provided that includes a mount to couple a first end of the apparatus with a vehicle. The apparatus also includes a foam bumper positioned at a second end of the apparatus opposite to the first end. The apparatus also includes a central foam structure. A first side of the central foam structure may be included in the first end of the apparatus coupled to the mount. A second side of the central foam structure opposite to the first side may be included in the second end of the apparatus where the foam bumper is positioned. The apparatus also includes a side foam structure positioned along a third side of the central foam structure. The side foam structure may be configured to be positioned above a wheel of the vehicle. The apparatus also includes a windshield coupled to the central foam structure and positioned at the first side of the central foam structure.

These as well as other aspects, advantages, and alternatives, will become apparent to those of ordinary skill in the art by reading the following detailed description, with reference where appropriate to the accompanying figures.

DETAILED DESCRIPTION

Figure 1:
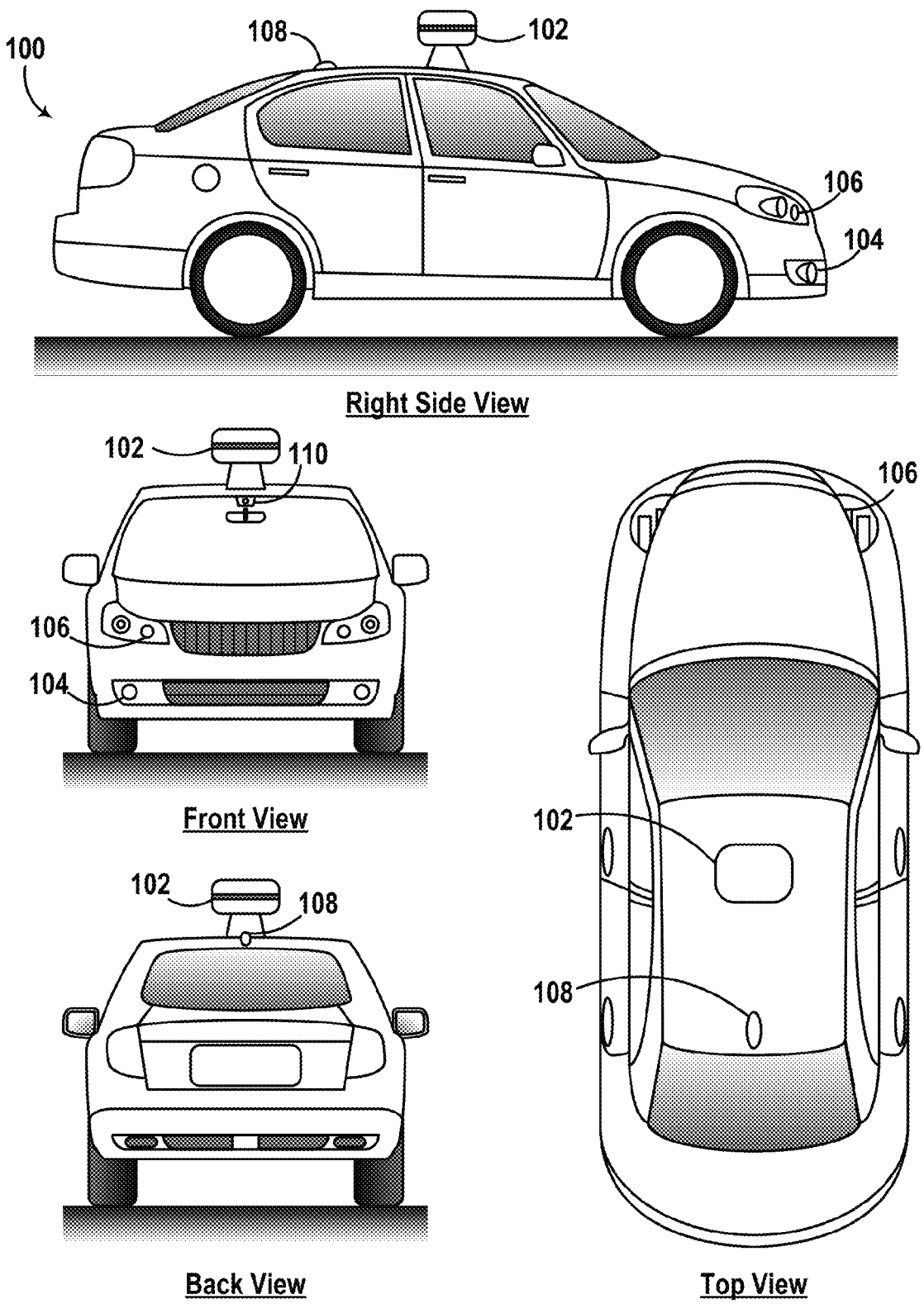
FIG. 1 illustrates a vehicle, according to an example embodiment.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

There are continued efforts to improve vehicle safety, including the development of autonomous vehicles equipped with accident-avoidance systems that may have the ability to avoid accidents. However, while such systems may improve the vehicle safety, it is desirable to provide safety mechanisms that reduce or prevent damage when a contact with a vehicle occurs. Example embodiments herein may include a section of a vehicle (e.g., front-end, back-end, side, middle, etc.) that includes one or more energy-absorbing materials selectively arranged to mitigate or prevent damage to an object in the event of an impact with the vehicle.

Within examples, an apparatus is provided that includes a mount to couple a first end of the apparatus with a vehicle. The apparatus may also include a bumper that includes a first energy-absorbing material (e.g., foam, sponge, etc.). The bumper may be positioned at a second end of the apparatus opposite to the first end. The apparatus may also include a central region that includes a second energy-absorbing material. A first side of the central region may be included in the first end of the apparatus coupled to the mount. A second side of the central region opposite to the first side may be included in the second end of the apparatus where the bumper is positioned. The apparatus may also include a side region that includes a third energy-absorbing material. The side region may be positioned along a third side of the central region. The side region may be configured to be positioned above a wheel of the vehicle. In some examples, the apparatus may also include a windshield.

Therefore, in some examples, the apparatus may be implemented as a separate physical structure coupled to the vehicle by the mount. For example, the apparatus may be configured as a removably mounted front-end of the vehicle. Additionally or alternatively, for example, the apparatus may be configured as a removably mounted back-end of the vehicle. In other examples, the apparatus and the vehicle may be implemented as a same physical structure. For example, the first energy-absorbing material may overlay a bumper of the vehicle, the second-energy absorbing material may overlay a hood/trunk of the vehicle, and the third energy-absorbing material may overlay one or more fenders of the vehicle.

In some examples, the various energy-absorbing materials in the apparatus may correspond to a same energy-absorbing material. For example, the first energy-absorbing material, the second energy-absorbing material, and the third energy-absorbing material may have same or similar material characteristics. Additionally or alternatively, in some examples, the various energy-absorbing materials may have different material characteristics. In one example, the first energy-absorbing material of the bumper may be softer than the second energy-absorbing material of the central region to alleviate severity of an initial impact with the vehicle. In another example, the third energy-absorbing material of the side region may be harder than the first energy-absorbing material and the second energy absorbing material to absorb hardness of the wheel during impact, and/or to pivot a side-impacted object towards the softer central region.

Further, in some examples, the apparatus may also include a protruding structure (e.g., kicker bar) positioned below the bumper. The protruding structure, for example, may be harder than the bumper. Thus, for example, the protruding structure may pivot an impacted object towards the softer bumper and/or the softer central region of the apparatus. For example, the protruding structure may cause the impacted object to be displaced off the ground to allow the pivoting of the impacted object towards the softer energy-absorbing materials. Thus, in this example, the energy from the impact may be distributed over a larger area of the object due to the protruding structure pivoting the object onto the various energy-absorbing materials. Consequently, damage to the object may be mitigated or prevented.

Many parameters of the disclosed embodiments allow for variation in properties. For example, hardness, toughness, foam density, foam volume, shape, position, etc., of the various energy-absorbing materials and/or the components of the apparatus may be varied to absorb the energy of the impact at different rates and/or to different extents, or to pivot an impacted object in a particular manner. The embodiments herein may therefore be tuned to specific purposes and applications, depending on the needs of the particular vehicle in question and the particular application.

Additionally, the embodiments disclosed herein may be used on any type of vehicle, including conventional automobiles and automobiles having an autonomous mode of operation. However, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among other examples.

Referring now to the Figures, FIG. 1 illustrates a vehicle 100, according to an example embodiment. In particular, FIG. 1 shows a Right Side View, Front View, Back View, and Top View of the vehicle 100. Although vehicle 100 is illustrated in FIG. 1 as a car, as discussed above, other embodiments are possible. Furthermore, although the example vehicle 100 is shown as a vehicle that may be configured to operate in autonomous mode, the embodiments described herein are also applicable to vehicles that are not configured to operate autonomously. Thus, the example vehicle 100 is not meant to be limiting.

As shown, the vehicle 100 includes a first sensor unit 102, a second sensor unit 104, a third sensor unit 106, a wireless communication system 108, and a camera 110. Each of the first, second, and third sensor units 102-106 may include any combination of global positioning system sensors, inertial measurement units, radio detection and ranging (RADAR) units, laser rangefinders, light detection and ranging (LIDAR) units, cameras, and acoustic sensors. Other types of sensors are possible as well.

While the first, second, and third sensor units 102-106 are shown to be mounted in particular locations on the vehicle 100, in some embodiments the sensor units 102-106 may be mounted elsewhere on the vehicle 100, either inside or outside the vehicle 100. Further, while only three sensor units are shown, in some embodiments more or fewer sensor units may be included in the vehicle 100.

In some embodiments, one or more of the first, second, and third sensor units 102-106 may include one or more movable mounts on which the sensors may be movably mounted. The movable mount may include, for example, a rotating platform. Sensors mounted on the rotating platform could be rotated so that the sensors may obtain information from each direction around the vehicle 100. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 102-106 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 108 may be any system configured to wirelessly couple to one or more other vehicles, sensors, or other entities, either directly or via a communication network. To this end, the wireless communication system 108 may include an antenna and a chipset for communicating with the other vehicles, sensors, or other entities either directly or via a communication network. The chipset or wireless communication system 108 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 108 may take other forms as well.

While the wireless communication system 108 is shown positioned on a roof of the vehicle 100, in other embodiments the wireless communication system 108 could be located, fully or in part, elsewhere.

The camera 110 may be any camera (e.g., a still camera, a video camera, etc.) configured to capture images of the environment in which the vehicle 100 is located. To this end, the camera 110 may be configured to detect visible light, or may be configured to detect light from other portions of the spectrum, such as infrared or ultraviolet light. Other types of cameras are possible as well. The camera 110 may be a two-dimensional detector, or may have a three-dimensional spatial range. In some embodiments, the camera 110 may be, for example, a range detector configured to generate a two-dimensional image indicating a distance from the camera 110 to a number of points in the environment. To this end, the camera 110 may use one or more range detecting techniques. For example, the camera 110 may use a structured light technique in which the vehicle 100 illuminates an object in the environment with a predetermined light pattern, such as a grid or checkerboard pattern and uses the camera 110 to detect a reflection of the predetermined light pattern off the object. Based on distortions in the reflected light pattern, the vehicle 100 may determine the distance to the points on the object. The predetermined light pattern may comprise infrared light, or light of another wavelength. As another example, the camera 110 may use a laser scanning technique in which the vehicle 100 emits a laser and scans across a number of points on an object in the environment. While scanning the object, the vehicle 100 uses the camera 110 to detect a reflection of the laser off the object for each point. Based on a length of time it takes the laser to reflect off the object at each point, the vehicle 100 may determine the distance to the points on the object. As yet another example, the camera 110 may use a time-of-flight technique in which the vehicle 100 emits a light pulse and uses the camera 110 to detect a reflection of the light pulse off an object at a number of points on the object. In particular, the camera 110 may include a number of pixels, and each pixel may detect the reflection of the light pulse from a point on the object. Based on a length of time it takes the light pulse to reflect off the object at each point, the vehicle 100 may determine the distance to the points on the object. The light pulse may be a laser pulse. Other range detecting techniques are possible as well, including stereo triangulation, sheet-of-light triangulation, interferometry, and coded aperture techniques, among others. The camera 110 may take other forms as well.

In some embodiments, the camera 110 may include a movable mount and/or an actuator, as described above, that are configured to adjust the position and/or orientation of the camera 110 by moving the camera 110 and/or the movable mount.

While the camera 110 is shown to be mounted inside a front windshield of the vehicle 100, in other embodiments the camera 110 may be mounted elsewhere on the vehicle 100, either inside or outside the vehicle 100.

The vehicle 100 may include one or more other components in addition to or instead of those shown.

Figure 2:
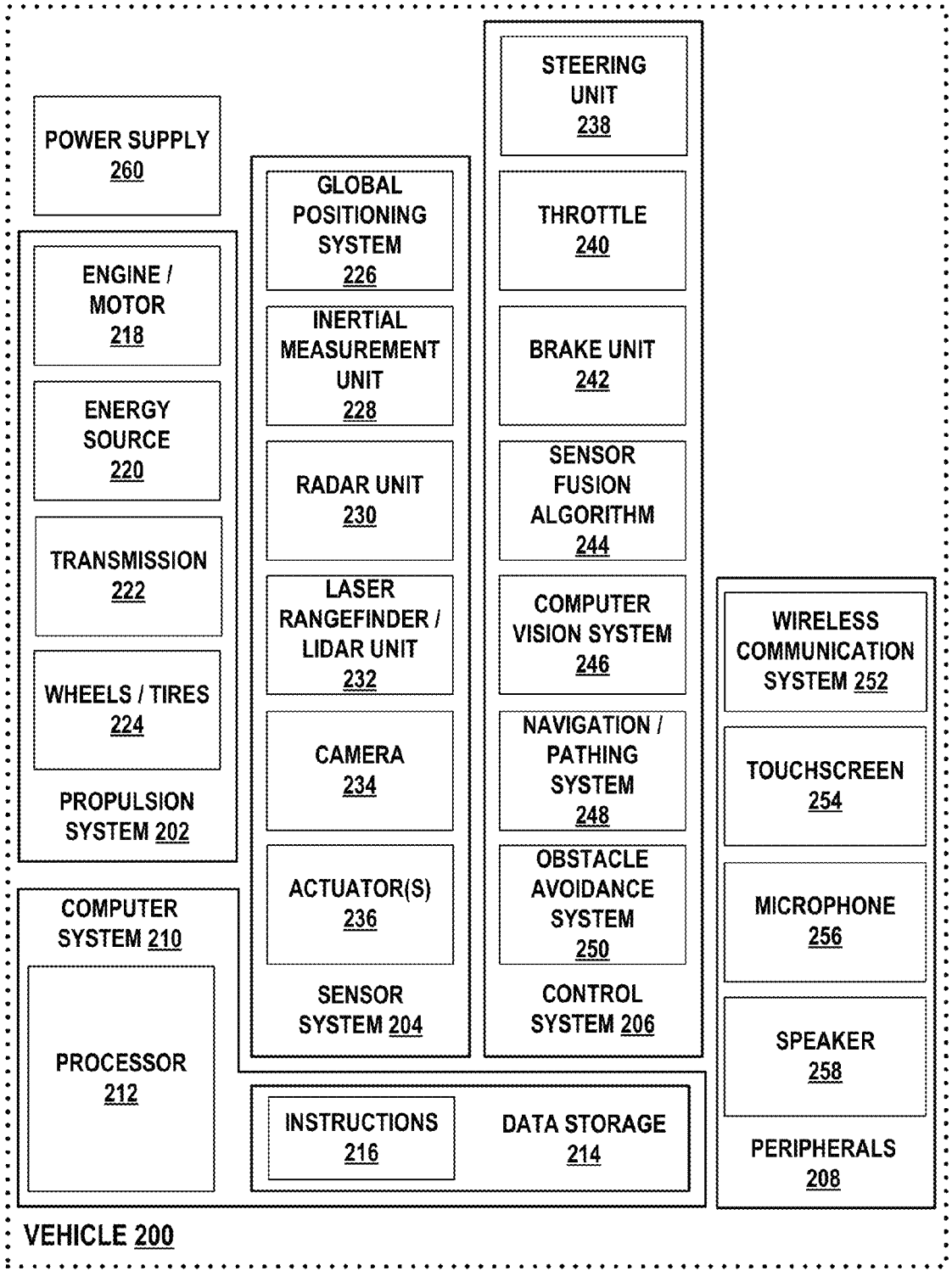
FIG. 2 is a simplified block diagram of a vehicle, according to an example embodiment.

FIG. 2 is a simplified block diagram of an example vehicle 200, in accordance with an embodiment. The vehicle 200 may, for example, be similar to the vehicle 100 described above in connection with FIG. 1. The vehicle 200 may take other forms as well.

As shown, the vehicle 200 includes a propulsion system 202, a sensor system 204, a control system 206, peripherals 208, and a computer system 210 including a processor 212, data storage 214, and instructions 216. In other embodiments, the vehicle 200 may include more, fewer, or different systems, and each system may include more, fewer, or different components. Additionally, the systems and components shown may be combined or divided in any number of ways.

The propulsion system 202 may be configured to provide powered motion for the vehicle 200. As shown, the propulsion system 202 includes an engine/motor 218, an energy source 220, a transmission 222, and wheels/tires 224.

The engine/motor 218 may be or include any combination of an internal combustion engine, an electric motor, a steam engine, and a Stirling engine. Other motors and engines are possible as well. In some embodiments, the propulsion system 202 could include multiple types of engines and/or motors. For instance, a gas-electric hybrid car could include a gasoline engine and an electric motor. Other examples are possible.

The energy source 220 may be a source of energy that powers the engine/motor 218 in full or in part. That is, the engine/motor 218 may be configured to convert the energy source 220 into mechanical energy. Examples of energy sources 220 include gasoline, diesel, propane, other compressed gas-based fuels, ethanol, solar panels, batteries, and other sources of electrical power. The energy source(s) 220 could additionally or alternatively include any combination of fuel tanks, batteries, capacitors, and/or flywheels. In some embodiments, the energy source 220 may provide energy for other systems of the vehicle 200 as well.

The transmission 222 may be configured to transmit mechanical power from the engine/motor 218 to the wheels/tires 224. To this end, the transmission 222 may include a gearbox, clutch, differential, drive shafts, and/or other elements. In embodiments where the transmission 222 includes drive shafts, the drive shafts could include one or more axles that are configured to be coupled to the wheels/tires 224.

The wheels/tires 224 of vehicle 200 could be configured in various formats, including a unicycle, bicycle/motorcycle, tricycle, or car/truck four-wheel format. Other wheel/tire formats are possible as well, such as those including six or more wheels. In any case, the wheels/tires 224 of vehicle 224 may be configured to rotate differentially with respect to other wheels/tires 224. In some embodiments, the wheels/tires 224 may include at least one wheel that is fixedly attached to the transmission 222 and at least one tire coupled to a rim of the wheel that could make contact with the driving surface. The wheels/tires 224 may include any combination of metal and rubber, or combination of other materials.

The propulsion system 202 may additionally or alternatively include components other than those shown.

The sensor system 204 may include a number of sensors configured to sense information about an environment in which the vehicle 200 is located, as well as one or more actuators 236 configured to modify a position and/or orientation of the sensors. As shown, the sensors of the sensor system 204 include a Global Positioning System (GPS) 226, an inertial measurement unit (IMU) 228, a RADAR unit 230, a laser rangefinder and/or LIDAR unit 232, and a camera 234. The sensor system 204 may include additional sensors as well, including, for example, sensors that monitor internal systems of the vehicle 200 (e.g., an $O_2$ monitor, a fuel gauge, an engine oil temperature, etc.). Other sensors are possible as well.

The GPS 226 may be any sensor configured to estimate a geographic location of the vehicle 200. To this end, the GPS 226 may include a transceiver configured to estimate a position of the vehicle 200 with respect to the Earth. The GPS 226 may take other forms as well.

The IMU 228 may be any combination of sensors configured to sense position and orientation changes of the vehicle 200 based on inertial acceleration. In some embodiments, the combination of sensors may include, for example, accelerometers and gyroscopes. Other combinations of sensors are possible as well.

The RADAR 230 unit may be any sensor configured to sense objects in the environment in which the vehicle 200 is located using radio signals. In some embodiments, in addition to sensing the objects, the RADAR unit 230 may additionally be configured to sense the speed and/or heading of the objects.

Similarly, the laser range finder or LIDAR unit 232 may be any sensor configured to sense objects in the environment in which the vehicle 200 is located using lasers. In particular, the laser rangefinder or LIDAR unit 232 may include a laser source and/or laser scanner configured to emit a laser and a detector configured to detect reflections of the laser. The laser rangefinder or LIDAR 232 may be configured to operate in a coherent (e.g., using heterodyne detection) or an incoherent detection mode.

The camera 234 may be any camera (e.g., a still camera, a video camera, etc.) configured to capture images of the environment in which the vehicle 200 is located. To this end, the camera may take any of the forms described above.

The sensor system 204 may additionally or alternatively include components other than those shown.

The control system 206 may be configured to control operation of the vehicle 200 and its components. To this end, the control system 206 may include a steering unit 238, a throttle 240, a brake unit 242, a sensor fusion algorithm 244, a computer vision system 246, a navigation or pathing system 248, and an obstacle avoidance system 250.

The steering unit 238 may be any combination of mechanisms configured to adjust the heading of vehicle 200.

The throttle 240 may be any combination of mechanisms configured to control the operating speed of the engine/motor 218 and, in turn, the speed of the vehicle 200.

The brake unit 242 may be any combination of mechanisms configured to decelerate the vehicle 200. For example, the brake unit 242 may use friction to slow the wheels/tires 224. As another example, the brake unit 242 may convert the kinetic energy of the wheels/tires 224 to electric current. The brake unit 242 may take other forms as well.

The sensor fusion algorithm 244 may be an algorithm (or a computer program product storing an algorithm) configured to accept data from the sensor system 204 as an input. The data may include, for example, data representing information sensed at the sensors of the sensor system 204. The sensor fusion algorithm 244 may include, for example, a Kalman filter, a Bayesian network, or another algorithm. The sensor fusion algorithm 244 may further be configured to provide various assessments based on the data from the sensor system 204, including, for example, evaluations of individual objects and/or features in the environment in which the vehicle 200 is located, evaluations of particular situations, and/or evaluations of possible impacts based on particular situations. Other assessments are possible as well.

The computer vision system 246 may be any system configured to process and analyze images captured by the camera 234 in order to identify objects and/or features in the environment in which the vehicle 200 is located, including, for example, traffic signals and obstacles. To this end, the computer vision system 246 may use an object recognition algorithm, a Structure from Motion (SFM) algorithm, video tracking, or other computer vision techniques. In some embodiments, the computer vision system 246 may additionally be configured to map the environment, track objects, estimate the speed of objects, etc.

The navigation and pathing system 248 may be any system configured to determine a driving path for the vehicle 200. The navigation and pathing system 248 may additionally be configured to update the driving path dynamically while the vehicle 200 is in operation. In some embodiments, the navigation and pathing system 248 may be configured to incorporate data from the sensor fusion algorithm 244, the GPS 226, and one or more predetermined maps so as to determine the driving path for vehicle 200.

The obstacle avoidance system 250 may be any system configured to identify, evaluate, and avoid or otherwise negotiate obstacles in the environment in which the vehicle 200 is located.

The control system 206 may additionally or alternatively include components other than those shown.

Peripherals 208 may be configured to allow the vehicle 200 to interact with external sensors, other vehicles, and/or a user. To this end, the peripherals 208 may include, for example, a wireless communication system 252, a touchscreen 254, a microphone 256, and/or a speaker 258.

The wireless communication system 252 may take any of the forms described above.

The touchscreen 254 may be used by a user to input commands to the vehicle 200. To this end, the touchscreen 254 may be configured to sense at least one of a position and a movement of a user's finger via capacitive sensing, resistance sensing, or a surface acoustic wave process, among other possibilities. The touchscreen 254 may be capable of sensing finger movement in a direction parallel or planar to the touchscreen surface, in a direction normal to the touchscreen surface, or both, and may also be capable of sensing a level of pressure applied to the touchscreen surface. The touchscreen 254 may be formed of one or more translucent or transparent insulating layers and one or more translucent or transparent conducting layers. The touchscreen 254 may take other forms as well.

The microphone 256 may be configured to receive audio (e.g., a voice command or other audio input) from a user of the vehicle 200. Similarly, the speakers 258 may be configured to output audio to the user of the vehicle 200.

The peripherals 208 may additionally or alternatively include components other than those shown.

The computer system 210 may be configured to transmit data to and receive data from one or more of the propulsion system 202, the sensor system 204, the control system 206, and the peripherals 208. To this end, the computer system 210 may be communicatively linked to one or more of the propulsion system 202, the sensor system 204, the control system 206, and the peripherals 208 by a system bus, network, and/or other connection mechanism (not shown).

The computer system 210 may be further configured to interact with and control one or more components of the propulsion system 202, the sensor system 204, the control system 206, and/or the peripherals 208. For example, the computer system 210 may be configured to control operation of the transmission 222 to improve fuel efficiency. As another example, the computer system 210 may be configured to cause the camera 234 to capture images of the environment. As yet another example, the computer system 210 may be configured to store and execute instructions corresponding to the sensor fusion algorithm 244. As still another example, the computer system 210 may be configured to store and execute instructions for displaying a display on the touchscreen 254. Other examples are possible as well.

As shown, the computer system 210 includes the processor 212 and data storage 214. The processor 212 may comprise one or more general-purpose processors and/or one or more special-purpose processors. To the extent the processor 212 includes more than one processor, such processors could work separately or in combination. Data storage 214, in turn, may comprise one or more volatile and/or one or more non-volatile storage components, such as optical, magnetic, and/or organic storage, and data storage 214 may be integrated in whole or in part with the processor 212.

In some embodiments, data storage 214 may contain instructions 216 (e.g., program logic) executable by the processor 212 to execute various vehicle functions. Data storage 214 may contain additional instructions as well, including instructions to transmit data to, receive data from, interact with, and/or control one or more of the propulsion system 202, the sensor system 204, the control system 206, and the peripherals 208.

The computer system 202 may additionally or alternatively include components other than those shown.

As shown, the vehicle 200 further includes a power supply 260, which may be configured to provide power to some or all of the components of the vehicle 200. To this end, the power supply 260 may include, for example, a rechargeable lithium-ion or lead-acid battery. In some embodiments, one or more banks of batteries could be configured to provide electrical power. Other power supply materials and configurations are possible as well. In some embodiments, the power supply 260 and energy source 220 may be implemented together, as in some all-electric cars.

In some embodiments, one or more of the propulsion system 202, the sensor system 204, the control system 206, and the peripherals 208 could be configured to work in an interconnected fashion with other components within and/or outside their respective systems.

Further, the vehicle 200 may include one or more elements in addition to or instead of those shown. For example, the vehicle 200 may include one or more additional interfaces and/or power supplies. Other additional components are possible as well. In such embodiments, data storage 214 may further include instructions executable by the processor 212 to control and/or communicate with the additional components.

Still further, while each of the components and systems are shown to be integrated in the vehicle 200, in some embodiments, one or more components or systems may be removably mounted on or otherwise connected (mechanically or electrically) to the vehicle 200 using wired or wireless connections.

The vehicle 200 may take other forms as well.

Figure 3:
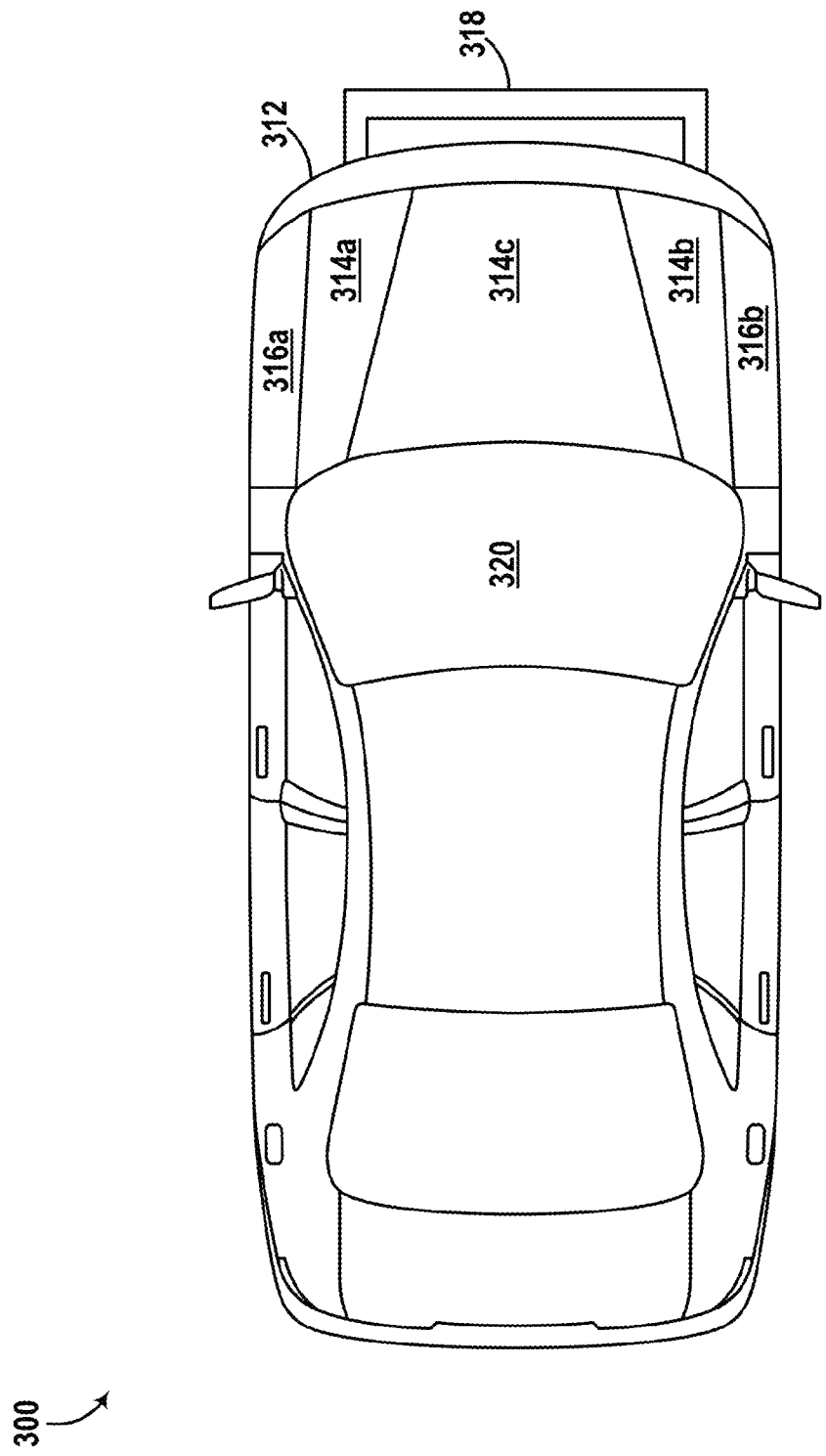
FIG. 3 illustrates a top-view of a vehicle, according to an example embodiment.

FIG. 3 illustrates a top-view of a vehicle 300, according to an example embodiment. The vehicle 300 may be similar to the vehicles 100 and/or 200 described in FIGS. 1-2. For example, the vehicle 300 may include components for moving the vehicle 300 similarly to the vehicle 200 (e.g., motor, energy source, transmission, wheels, brake system, etc.). Further, for example, the vehicle 300 may include control components for operating the vehicle 300 autonomously (e.g., sensors, control system, computer vision, etc.) similarly to the vehicle 200. However, in some examples, the vehicle 300 may be configured as a manually operated vehicle by a human operator (e.g., human driver, etc.). Other operation modes are possible as well (e.g., partially autonomous, etc.). The vehicle 300 includes a bumper 312, central regions 314a-314c, side regions 316a-316b. In some examples, the vehicle 300 may optionally include a protruding structure 318 and/or a windshield 320. Other components are possible as well.

Although FIG. 3 shows the vehicle 300 as a passenger vehicle, in some examples, the vehicle 300 may be alternatively configured as a different type of vehicle such as a truck, a van, a semi-trailer truck, a motorcycle, a golf cart, an off-road vehicle, a warehouse transport vehicle, a farm vehicle, etc. An example scenario for the operation of the vehicle 300 is as follows. The vehicle 300 may be configured as a warehouse transport vehicle. In the scenario, the vehicle 300 and other similar vehicles may be operated by a central operator (e.g., human operator, computer operator, etc.) to transport various objects (e.g., crates, etc.) from one location to another location in the warehouse. In the scenario, the vehicle 300 may include a robotic arm (not shown in FIG. 3) to load the vehicle 300 with an object, and then the vehicle 300 may move to a destination location where the robotic arm may unload the object. In this scenario, the vehicle 300 may also include sensors (not shown in FIG. 3) to detect a surrounding environment of the vehicle 300 and avoid collision with other objects (e.g., other vehicles, other crates, furniture, etc.) in the environment, similarly to the vehicles 100-200 of FIGS. 1-2. However, the vehicle 300 may also include additional safety mechanisms in the event of such collision to reduce or prevent damage to the impacted objects.

As illustrated in FIG. 3, the bumper 312 may be positioned at a front end of the vehicle 300. Further, the central regions 314a-c may be positioned between the bumper 312 and a frame (e.g., chassis, etc.) of the vehicle 300. Further, the side regions 316a-b may be positioned along sides of the central regions 314a-c) and above one or more wheels of the vehicle 300. For example, the side region 316a may be positioned along a side of the central region 314a, and the side region 316b may be positioned along a side of the central region 314b.

To facilitate reducing or preventing damage to an impacted object, the bumper 312, the central regions 314a-c, and/or the side regions 316a-b may include one or more energy-absorbing materials to absorb energy from a collision in a particular manner to reduce or prevent damage to the impacted object. Example energy-absorbing materials may include a foam such as closed cell foam, open cell foam, polyurethane foam, XPS foam, polystyrene, phenolic, memory foam, flower foam, or any other foam. Other types of energy-absorbing materials are possible as well such as sponges, rubbers, aluminium honeycomb, etc.

In some examples, the one or more energy-absorbing materials may have similar material characteristics. In other examples, the one or more energy-absorbing materials may have different material characteristics to pivot the impacted object in a particular direction and/or distribute the energy from the impact over a larger area of the impacted object. For example, the material characteristics of the one or more energy-absorbing materials may be selected according to a particular application of the vehicle 300.

By way of example, the components of the vehicle 300 may be configured to reduce and/or prevent damage to an object. Accordingly, for example, a bumper energy-absorbing material of the bumper 312 may correspond to a soft energy-absorbing material to reduce damage caused by an initial impact with the object. Further, for example, the central regions 314a-c may include a central region energy-absorbing material that is harder than the bumper energy-absorbing material to absorb a greater amount of energy over a larger area of the impacted object. Additionally, for example, the side regions 316a-b may include a side region energy-absorbing material that is harder than the central region energy-absorbing material and the bumper energy-absorbing material to absorb hardness of wheels of the vehicle 300 due to the impact. Moreover, for example, the harder side region energy-absorbing material may cause the impacted object to pivot towards the softer central regions 314a-c. Thus, for example, an upper part of the object (e.g., fragile part, etc.) may be directed to the softer central regions 314a-c to alleviate severity of damage in such parts.

Therefore, some example embodiments described herein may include varying material characteristics of the one or more energy-absorbing materials (e.g., hardness, toughness, tensile strength, flexibility, etc.) to distribute energy from an impact to a particular type of object based on geometry or other characteristics of the particular type of object. In some examples, an impacted object may include inanimate objects such as furniture, other vehicles, fragile objects, walls, poles, etc. In other examples, the impacted object may include animate objects such as pedestrians, animals, etc. Thus, in some examples, systems and devices herein may reduce damage and/or prevent injury to the impacted object. By way of example, the central region 314c may have a lower hardness than the central regions 314a-b based on an expectation that a particular part of an impacted object (e.g., fragile portion of the object, etc.) may be directed to the central region 314c in the event of an impact. Other example arrangements are possible as well. The material characteristics may be varied in different ways such as varying density, type, volume, shape, position, etc., of the one or more energy-absorbing materials and/or the components of the vehicle 300.

The protruding structure 318 may optionally be included in the vehicle 300 to further facilitate pivoting an impacted object. The protruding structure 318 (e.g., kicker bar, etc.) may be positioned below the bumper 312. In some examples, the protruding structure 318 may include an energy-absorbing material similarly to the bumper 312, the central regions 314a-c, and/or the side regions 316a-b. In other examples, the protruding structure 318 may include another solid material (e.g., metal, plastic, composite, wood, etc.). In some examples, the protruding structure 318 may have a greater hardness than the bumper 312. Thus, for example, a lower part of an impacted object may initially contact the protruding structure 318 and pivot towards the softer bumper 312 and/or the softer central regions 314a-c. By way of example, an impacted object may be pivoted off the ground by the protruding structure 318 towards the various energy-absorbing materials (e.g., bumper 312, central regions 314a-c, side regions 316a-b, etc.) to reduce or prevent damage to the object, and/or to distribute the energy from the impact in a particular manner (e.g., reduce possibility of damage to fragile areas of the object, etc.).

Although FIG. 3 shows the protruding structure 318 having a straight shape, other shapes are possible. For example, the protruding structure 318 may have a curved shape similarly to a shape of the bumper 312, or the protruding structure 318 may have any other shape according to the particular application of the vehicle 300.

The windshield 320 may optionally be included in the vehicle 300 to further facilitate reducing or preventing damage in the event of an impact. For example, the windshield 300 may include a compliant energy-absorbing material (e.g., flexible polycarbonate, etc.) to absorb energy from the impact. Further, for example, the windshield 320 may be mounted to the vehicle 300 by an energy-absorbing mount to allow translation of the windshield 320 upon impact. In this example, at least some of the energy from the impact may also be dissipated by the energy-absorbing mount. The windshield 320 may be positioned at or proximal to an end of the central regions 314a-b opposite to the end where the bumper 312 is positioned.

In some examples, some of the components of the vehicle 300 may be implemented as a separate structure mounted to a frame of the vehicle 300. For example, a front section of the vehicle 300 including the bumper 312, the central regions 314a-c, the side regions 316a-b, the protruding structure 318, and/or the windshield 320 may be implemented as a separate structure and mounted to the frame of the vehicle 300 by a mount. In this example, the central regions 314a-c may also correspond to a hood of the vehicle 300. In other examples, the front section of the vehicle 300 (e.g., the bumper 312, the central regions 314a-c, the side regions 316a-b, the protruding structure 318, and/or the windshield 320) may be implemented as a same structure of the vehicle 300. For example, the bumper energy-absorbing material of the bumper 312 may be positioned above a front bumper of the vehicle 300, the central region energy-absorbing material of the central regions 314a-c may be positioned above a hood of the vehicle 300, and/or the side region energy-absorbing material of the side regions 316a-b may be positioned above one or more fenders of the vehicle 300.

Further, in some examples, other sections of the vehicle 300 (e.g., back-end, middle, side, etc.) may be configured similarly to the front section of the vehicle 300. For example, the bumper 312 may alternatively correspond to a back-end bumper of the vehicle 300, the central regions 314a-c may alternatively correspond to a trunk of the vehicle 300, and/or the side regions 316a-b may alternatively correspond to back-end side regions above back wheels of the vehicle 300. Therefore, in some examples, the vehicle 300 may be configured to include energy-absorbing materials in other sections of the vehicle 300 as well that are configured and arranged similarly to the components described herein, where an impact between the vehicle 300 and an object may occur.

Additionally, in some examples, the vehicle 300 may include an energy-absorbing coating layer (e.g., polyurethane, vinyl, etc.) coupled to some or all of the various energy-absorbing components (e.g., the bumper 312, the central regions 314a-c, the side regions 316a-b, etc.). Further, in some examples, such energy-absorbing layer may have various texture configurations such as continuous, scored, perforated, etc. By way of example, a polyurethane coating layer may be applied to the protruding structure 318 to adjust hardness or other material characteristics of the protruding structure 318. Other examples are possible as well.

Figure 4A:
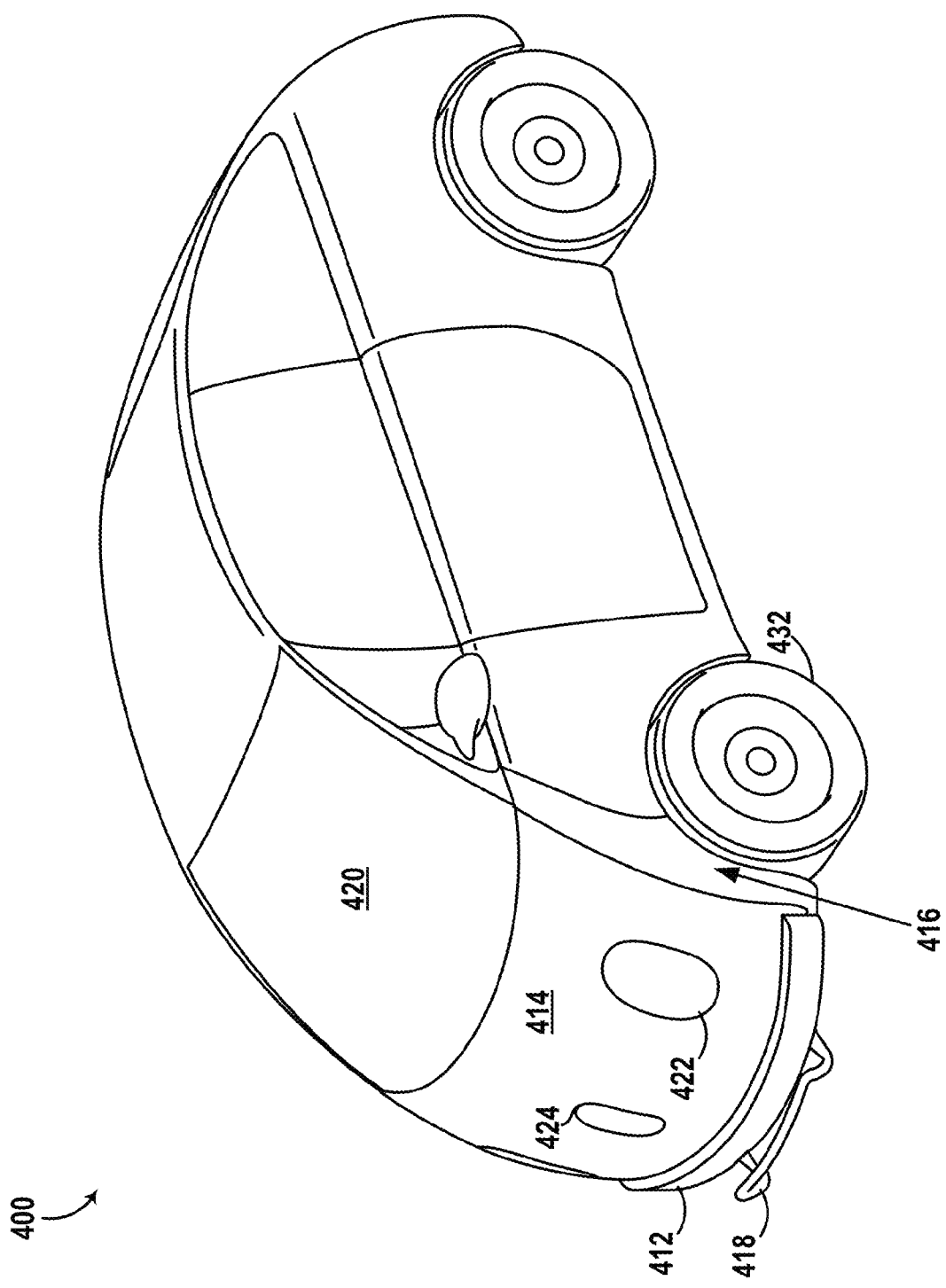
FIG. 4A illustrates another vehicle, according to an example embodiment.

FIG. 4A illustrates another vehicle 400, according to an example embodiment. The vehicle 400 may be similar to the vehicles 100, 200, and/or 300 described in FIGS. 1-3. For example, the vehicle 400 may include components for moving the vehicle 400 similarly to the vehicle 200 (e.g., motor, energy source, transmission, wheels, brake system, etc.). Further, for example, the vehicle 400 may include control components for operating the vehicle 400 autonomously (e.g., sensors, control system, computer vision, etc.) similarly to the vehicle 200. However, in some examples, the vehicle 400 may be configured as a manually operated vehicle by a human operator (e.g., human driver, etc.). Other operation modes are possible as well (e.g., partially autonomous, etc.). Additionally, the vehicle 400 includes a bumper 412 (e.g., "foam bumper", etc.), an central region 414 (e.g., "central foam structure", etc.), a side region 416 (e.g., "side foam structure", etc.), a protruding structure 418, and a windshield 420 that are similar, respectively, to the bumper 312, the central regions 314a-c, the side regions 316a-b, the protruding structure 318, and the windshield 320 of the vehicle 300 illustrated in FIG. 3. Further, the vehicle 400 may include one or more electronic devices such as headlight 422 and sensor(s) 424.

The headlight 422 (e.g., "one or more electronic devices", etc.) may be configured to provide light propagating out of a front section of the vehicle 400. For example, the headlight 422 may include a light source such as a resistive filament (e.g., tungsten, etc.), a neon lamp, a halogen lamp, a light emitting diode (LED), or any other light source.

The sensor 424 may include one or more sensors, similarly to the sensors included in the sensor system 204 of the vehicle 200. For example, the sensor 424 may include a range sensor (e.g., LIDAR) to detect objects or obstacles in the surrounding environment of the vehicle 400. Further, for example, the sensor 424 may include a pressure sensor to detect a collision between the vehicle 400 and an object in the surrounding environment. Other types of sensors are possible as well. In an example scenario, the vehicle 400 may detect an impact with an object based on an output of the sensor 424, and the vehicle 400 may responsively activate various safety features. For example, the vehicle 400 may activate airbags or brakes to protect occupants of the vehicle 400 and/or to protect the impacted object. Further, for example, the vehicle 400 may collapse/translate some of the harder components of the vehicle 400 (e.g., headlight 422, sensor 424, windshield 420, etc.) to further mitigate damage to the impacted object.

Accordingly, in some examples, various components of the vehicle 400 such as the windshield 420, the headlight 422, and the sensor(s) 424 may be flexibly mounted onto the vehicle 400. For example, in the event of an impact, the headlight 422 and/or the sensor 424 may be configured to collapse into the central region 414 to reduce or prevent damage to the impacted object.

The vehicle 400 may also include other components such as wheel 432. The wheel 432 may be similar to the wheels/tires 224 of the vehicle 200. As illustrated in FIG. 4A, the side region 416 may be configured to be positioned above the wheel 432. For example, the side region 416 may include an energy-absorbing material having a given hardness to absorb energy from the wheel 432 and/or a fender (not shown in FIG. 4A) above the wheel 432 in the event of an impact.

Figure 4B:
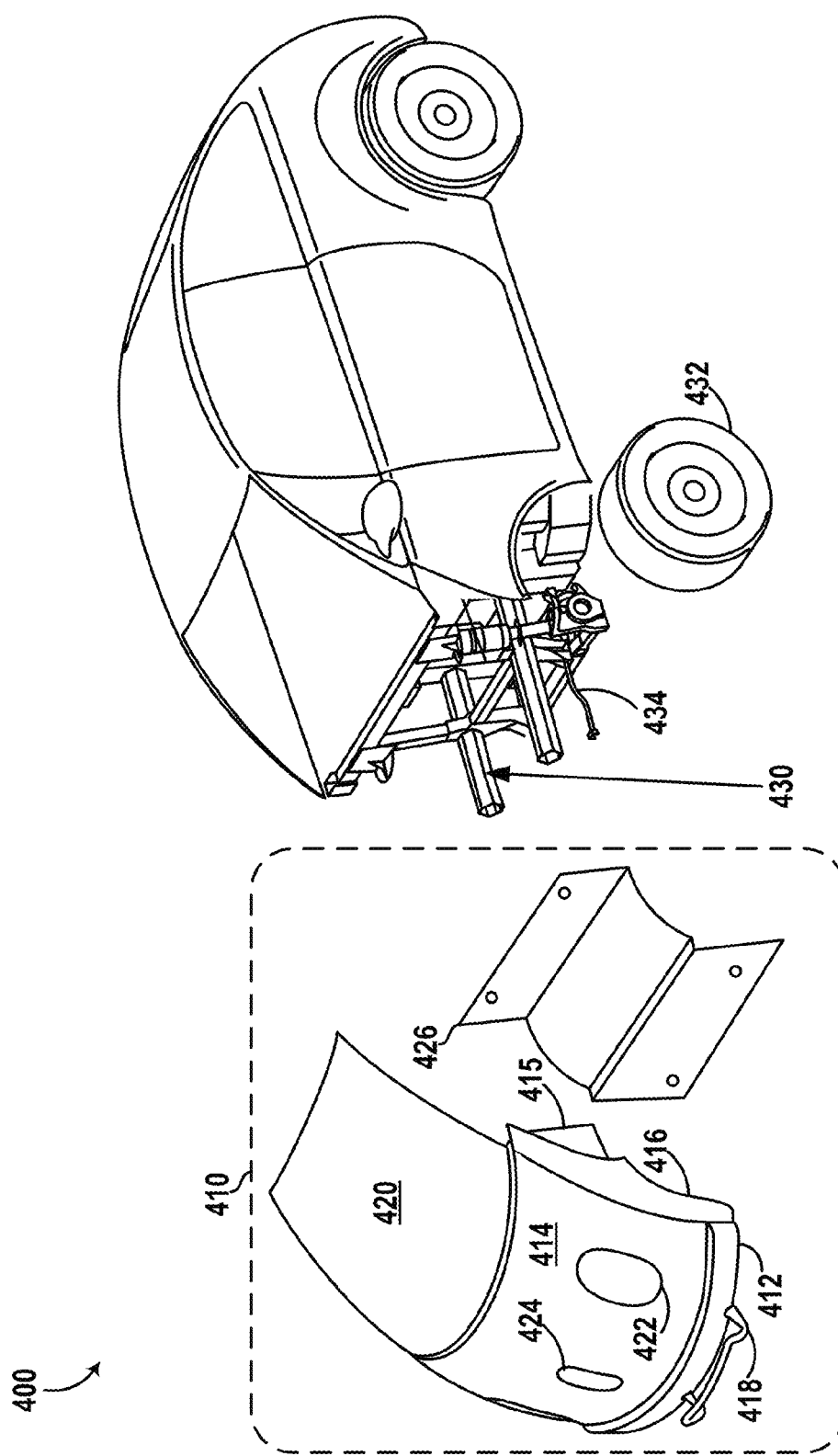
FIG. 4B illustrates a partial exploded view of the vehicle in FIG. 4A.

FIG. 4B illustrates a partial exploded view of the vehicle 400 in FIG. 4A. As illustrated in FIG. 4B, the vehicle 400 includes a frame 430. The frame 430 may be configured as a chassis of the vehicle. For example, the frame 430 may include various components such as a suspension device, a shock absorber, etc., to mount wheels of the vehicle such as the wheel 432, and may include other components such as support members to support other parts of the vehicle 400. The frame 430 may be formed from various materials such as aluminum, titanium, steel, other metal/metal-alloy, plastic, composite, or any other solid material suitable for supporting the various components of the vehicle 400. Further, the frame 430 may include wiring 434 for connectivity between the one or more electronic components (e.g., headlight 422, sensor 424, etc.) in the vehicle 400 and the frame of the vehicle 400. The wiring 434 may also be configured to provide power to such electronic components.

In some examples, a section of the vehicle 400 may be implemented as a separate physical device. As illustrated in FIG. 4B, for example, the vehicle 400 includes an apparatus 410. The apparatus 410 may correspond to a front-end of the vehicle 400. However, in some examples, the apparatus 410 may correspond to a back-end, side, middle, or other section of the vehicle 400.

The apparatus 410 may include the various energy-absorbing components of the vehicle 400. For example, the apparatus 410 may include the bumper 412, the central region 414, the side region 416, the protruding structure 418, the windshield 420, the headlight 422, and/or the sensor 424. Thus, in some examples, the apparatus 410 may be coupled to the frame 430 of the vehicle 400 via a mount 426 included in the apparatus 410.

The mount 426 may be formed from various solid materials suitable for supporting the apparatus 410 and coupling the apparatus 410 with the frame 430 such as aluminum, titanium, steel, other metals/alloys, plastic, composite, wood, etc. In one example, the mount 410 may be implemented as a machined aluminum structure that includes holes for fastening bolts and/or screws to couple the apparatus 410 with the frame 430. Other example implementations of the mount 410 are possible as well. For example, an adhesive may be utilized to couple the mount 426 to the apparatus 410, and bolts may be utilized to couple the mount 426 with the frame 430. It is noted that relative dimensions and shapes of the various components in the apparatus 410 are for exemplary purposes only. Other dimensions and/or shapes are possible as well.

Although FIG. 4B illustrates the mount 426 as a component of the apparatus 410, in some examples, the mount 426 may be implemented differently. In one example, the mount 426 may be included in the vehicle 400 (e.g., coupled to the frame 430). In another example, the mount 426 may be implemented as an independent physical structure configured to couple with both the frame 430 and the apparatus 410.

As illustrated in FIG. 4B, a first end of the apparatus 410 may include a first side 415 of the central region 414 and may be coupled, via the mount 426, with the frame 430 of the vehicle 400. Further, a second side of the central region 414 opposite to the first side 415 may be included in a second end of the apparatus 410 opposite to the first end of the apparatus 410. The second end of the apparatus 410 may correspond to the end where the bumper 412 is positioned. Moreover, for example, the side region 416 may be positioned along a third side of the central region 414 (e.g., the side illustrated in the FIG. 4B).

Figure 4C:
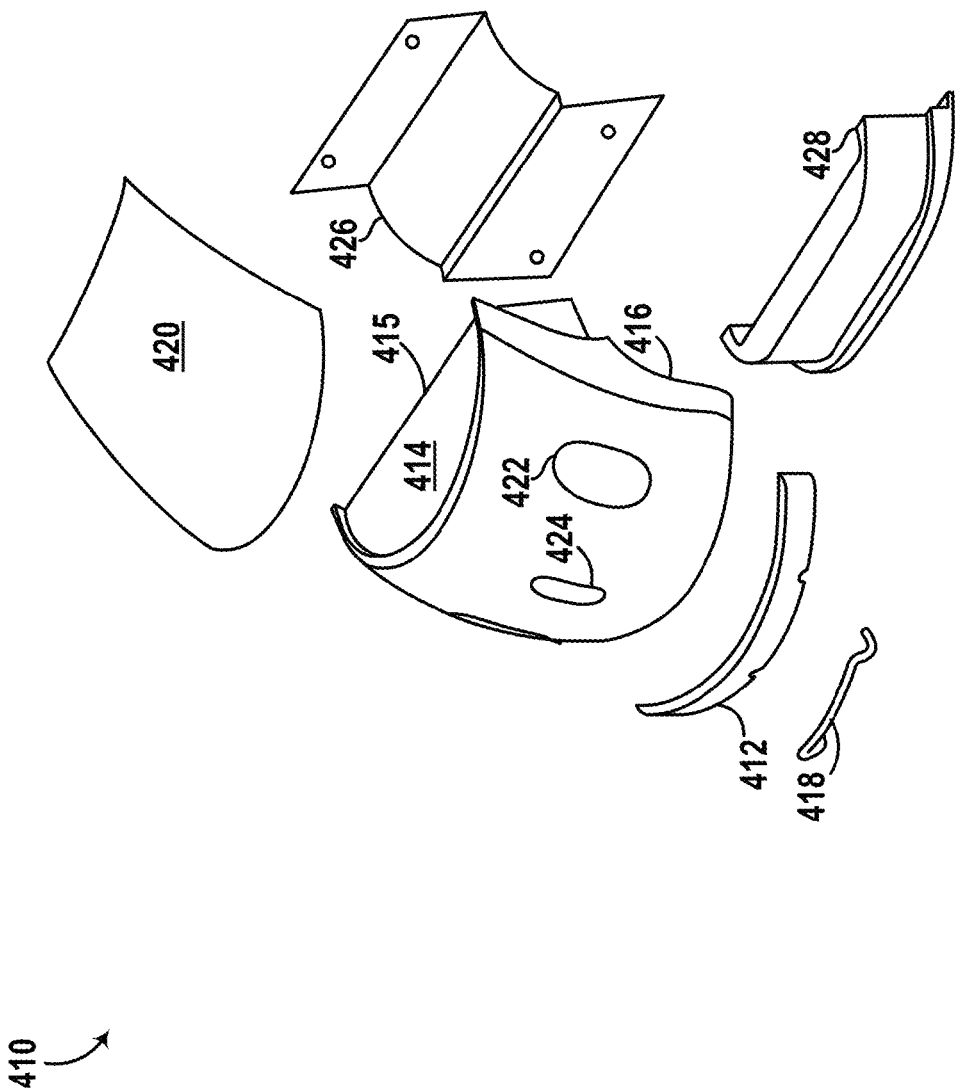
FIG. 4C illustrates a partial exploded view of the apparatus in FIG. 4B.

FIG. 4C illustrates a partial exploded view of the apparatus 410 in FIG. 4B. As illustrated in FIG. 4C, the apparatus 410 may also include a removable energy-absorbing material 428 (e.g., "removable foam structure", etc.) positioned below the central region 414. The removable energy-absorbing material 428 may include various energy-absorbing materials, such as closed cell foam, open cell foam, memory foam, etc., similarly to the other energy-absorbing materials of the bumper 412, the central region 414, and/or the side region 416. The removable energy-absorbing material 428 may include wiring for connectivity between the frame 430 and the one or more electronic devices (e.g., headlight 422, sensor 424, etc.) included in the apparatus 410. Thus, for example, the removable energy-absorbing material 428 may absorb some of the energy from an impact, and also provide a convenient removable structure for maintenance and installation of the headlight 422, the sensor 424, other electronic devices in the apparatus 410, and/or wiring between such electronic devices and the frame 430. In some examples, the removable energy-absorbing material 428 may be configured as an access foam that may be removed to allow access to internal components of the apparatus 410 (e.g., signal lights, headlight 422, sensor 424, etc.) during assembly and/or maintenance of the apparatus 410.

Various configurations of the removable energy-absorbing material 428 are possible to provide such connectivity. In one example, a hole may be drilled into the removable energy-absorbing material 428 to receive the wiring 434 (illustrated in FIG. 4B) and connect the wiring 434 to the headlight 422 and/or the sensor 424. In another example, the removable energy-absorbing material 428 may include wiring embedded in the removable energy-absorbing material 428 and one or more sockets coupled to such wiring. In this example, a first socket may connect to wiring from the headlight 422 and/or the sensor 424, and a second socket may connect to the wiring 434 of the frame 430. Other examples are possible as well.

Various positions for the components of the apparatus 410 are also possible to alleviate severity of an impact with the vehicle 400. For example, alternatively to the arrangement illustrated in FIG. 4B, the windshield 420 may be positioned at or closer to the first side 415 of the central region 414. For example, the windshield 420 may be positioned at a threshold distance (e.g., 15 inches, etc.) from the second end of the apparatus 410 where the bumper 412 is positioned. Various threshold distances are possible according to a particular application of the vehicle 400. In one example, the threshold distance may be determined based on an average height of an object such that, in the event of an impact, a large area of the object may be received by the soft central region 414. In another example, the vehicle 400 may be configured to operate in a warehouse that includes fragile objects (e.g., furniture, etc.) or animate objects (e.g., pedestrians, animals, etc.), and thus the threshold distance may be determined based on dimensions of such objects. Other examples are possible as well.

As another example of varying positions of components in the apparatus 410, the headlight 422 and/or the sensor 424 may be disposed within the central region 414. For example, the headlight 422 may be positioned to be at a threshold distance (e.g., 2 inches, etc.) from a surface of the central region 414. Consequently, in this example, an impacted object may be more likely to contact the softer central region 414 than the harder electronic devices (e.g., headlight 422, sensor 424, etc.). Moreover, the threshold distance may be based on the particular application of the vehicle 400. Therefore, within examples, the various positions, shapes, material types, etc., of the components in the apparatus 410 may be varied according to the particular application of the vehicle 400.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A vehicle comprising:
   a frame;
   an apparatus coupled to the frame at a first end of the apparatus, wherein the apparatus extends from one side of the vehicle to an opposite side of the vehicle, and wherein the apparatus comprises:
   a central region of the apparatus that includes a first energy-absorbing material, wherein a first side of the first energy-absorbing material is included in the first end of the apparatus coupled to the frame, and
   a side region of the apparatus that includes a second energy-absorbing material positioned outside the central region to overlap in contact with a second side of the first energy-absorbing material other than the first side, wherein the first energy-absorbing material is positioned outside the side region, wherein the second energy-absorbing material is positioned to overlap above a wheel of the vehicle, and wherein the first energy-absorbing material and the second energy-absorbing material have different material characteristics; and
   a mount to couple the apparatus with the frame.

2. The vehicle of claim 1, wherein the first energy-absorbing material of the central region has a first hardness that is less than a second hardness of the second energy-absorbing material of the side region.

3. The vehicle of claim 1, wherein the apparatus further comprises a bumper that includes a third energy-absorbing material, wherein the bumper is positioned at a second end of the apparatus opposite to the first end, and wherein a third side of the first energy-absorbing material opposite to the first side is included in the second end of the apparatus where the bumper is positioned.

4. The vehicle of claim 3, wherein the apparatus further comprises a protruding structure positioned below the bumper and at the second end of the apparatus.

5. The vehicle of claim 4, wherein the protruding structure includes a fourth energy-absorbing material having a hardness that is greater than a given hardness of the third energy-absorbing material in the bumper.

6. The vehicle of claim 1, wherein the apparatus further comprises a removable energy-absorbing material positioned below the first energy-absorbing material, wherein the removable energy-absorbing material includes wiring for connectivity between the frame and one or more electronic devices included in the apparatus.

7. The vehicle of claim 1, wherein the apparatus further comprises an energy-absorbing coating layer.

8. The vehicle of claim 1, wherein the central region includes a hood.

9. The vehicle of claim 1, wherein the central region includes a trunk.

10. The vehicle of claim 1, wherein the apparatus further comprises a windshield.

11. An apparatus comprising:
    a mount to couple a first end of the apparatus with a vehicle, wherein the apparatus extends from one side of the vehicle to an opposite side of the vehicle;
    a central region that includes a first energy-absorbing material, wherein a first side of the first energy-absorbing material is included in the first end of the apparatus coupled to the mount; and
    a side region that includes a second energy-absorbing material positioned outside the central region to overlap in contact with a second side of the first energy-absorbing material other than the first side, wherein the first energy-absorbing material is positioned outside the side region, wherein the second energy-absorbing material is configured to be positioned to overlap above a wheel of the vehicle, and wherein the first energy-absorbing material and the second energy-absorbing material have different material characteristics.

12. The apparatus of claim 11, further comprising:
    a bumper that includes a third energy-absorbing material, wherein the bumper is positioned at a second end of the apparatus opposite to the first end, and wherein a third side of the first energy-absorbing material opposite to the first side is included in the second end of the apparatus where the bumper is positioned.

13. The apparatus of claim 12, further comprising a protruding structure positioned below the bumper and at the second end of the apparatus.

14. The apparatus of claim 11, further comprising:
    one or more electronic devices; and a removable energy-absorbing material positioned below the first energy-absorbing material, wherein the removable energy-absorbing material includes wiring for connectivity between the frame and the one or more electronic devices.

15. The apparatus of claim 11, further comprising a windshield.

16. An apparatus comprising:
a mount to couple a first end of the apparatus with a vehicle, wherein the apparatus extends from one side of the vehicle to an opposite side of the vehicle;
a foam bumper positioned at a second end of the apparatus opposite to the first end;
a central foam structure, wherein a first side of the central foam structure is included in the first end of the apparatus coupled to the mount, and wherein a second side of the central foam structure opposite to the first side is included in the second end of the apparatus where the foam bumper is positioned;
a side foam structure positioned outside the central foam structure to overlap in contact with a third side of the central foam structure other than the first side and the second side, wherein the central foam structure is positioned outside the side foam structure, wherein the side foam structure is configured to be positioned to overlap above a wheel of the vehicle, and wherein the central foam structure and the side foam structure have different material characteristics; and
a windshield coupled to the central foam structure and positioned at the first side of the central foam structure.

17. The apparatus of claim 16, further comprising:
one or more electronic devices; and
a removable foam structure positioned below the central foam structure, wherein the removable foam structure includes wiring for connectivity between the frame and the one or more electronic devices.

18. The apparatus of claim 16, further comprising a polyurethane coating layer.

19. The apparatus of claim 16, further comprising a protruding structure positioned below the foam bumper and at the second end of the apparatus.

* * * * *